(12) United States Patent
Hu et al.

(10) Patent No.: US 11,670,208 B2
(45) Date of Patent: Jun. 6, 2023

(54) POWER SUPPLY CONTROL CIRCUIT AND DISPLAY DEVICE

(71) Applicant: SHENZHEN SKYWORTH-RGB ELECTRONIC CO., LTD., Shenzhen (CN)

(72) Inventors: Xiangfeng Hu, Shenzhen (CN); Xiaojie Bao, Shenzhen (CN); Qiaofu Pan, Shenzhen (CN); Yawei Li, Shenzhen (CN); Deqiang Huang, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 88 days.

(21) Appl. No.: 17/485,438

(22) Filed: Sep. 26, 2021

(65) Prior Publication Data

US 2022/0013055 A1 Jan. 13, 2022

Related U.S. Application Data

(63) Continuation of application No. PCT/CN2020/105552, filed on Jul. 29, 2020.

(30) Foreign Application Priority Data

Sep. 6, 2019 (CN) .......................... 201910845564.8

(51) Int. Cl.
*G09G 3/20* (2006.01)
*H02M 3/335* (2006.01)
(Continued)

(52) U.S. Cl.
CPC ............ *G09G 3/20* (2013.01); *H02M 1/4208* (2013.01); *H02M 1/44* (2013.01);
(Continued)

(58) Field of Classification Search
CPC .... G09G 3/20; G09G 3/3406; G09G 2330/02; G09G 2330/021; H02M 3/33571; H02M 1/4208; H02M 1/44
See application file for complete search history.

(56) References Cited

U.S. PATENT DOCUMENTS 6,930,893 B2   8/2005   Vinciarelli
2012/0086867 A1   4/2012   Kesler et al.
(Continued)

FOREIGN PATENT DOCUMENTS

CN   101938222 A   1/2011
CN   201846423 U   5/2011
(Continued)

OTHER PUBLICATIONS

Examination Report issued in counterpart Indian Patent Application No. 202127050018, dated Apr. 11, 2022.
(Continued)

*Primary Examiner* — Gerald Johnson
(74) *Attorney, Agent, or Firm* — Westbridge IP LLC

(57) ABSTRACT

Disclosed are a power supply control circuit and a display device. An output terminal of the power factor correction circuit is connected to the resonance circuit; a first output terminal of the resonance circuit is connected to the backlight module through the first rectification filter circuit, and a second output terminal of the resonance circuit is connected to the control circuit board and the communication circuit through the second rectification filter circuit; a third output terminal of the resonance circuit is connected to the control system and the communication circuit; the control circuit board is connected to the control system through the communication circuit; a first signal output terminal of the control system is connected to the power factor correction
(Continued)

circuit; and a second signal output terminal of the control system is connected to the resonance circuit.

18 Claims, 3 Drawing Sheets

(51) Int. Cl.
 *H02M 1/42* (2007.01)
 *H02M 1/44* (2007.01)
(52) U.S. Cl.
 CPC .. *H02M 3/33571* (2021.05); *G09G 2330/021* (2013.01); *G09G 2330/06* (2013.01)

(56) References Cited

U.S. PATENT DOCUMENTS

2018/0323650 A1* 11/2018 Choi ................. H02J 50/80
2019/0149761 A1 5/2019 Cai et al.

FOREIGN PATENT DOCUMENTS

| | | |
|---|---|---|
| CN | 104396128 A | 3/2015 |
| CN | 105376508 A | 3/2016 |
| CN | 109039052 A | 12/2018 |
| CN | 109547721 A | 3/2019 |
| CN | 110620888 A | 12/2019 |
| EP | 2197094 A1 | 6/2010 |

OTHER PUBLICATIONS

Supplementary European Search Report issued in counterpart European Patent Application No. 20861745.6, dated Nov. 24, 2022.
First Office Action issued in counterpart Chinese Patent Application No. 201910845564.8, dated Jan. 27, 2021.
International Search Report and Written Opinion issued in corresponding PCT Application No. PCT/CN2020/105552, dated Oct. 22, 2020.

* cited by examiner

POWER SUPPLY CONTROL CIRCUIT AND DISPLAY DEVICE

CROSS-REFERENCE TO RELATED APPLICATIONS

This application is a continuation application of International Application No. PCT/CN2020/105552, filed on Jul. 29, 2020, which claims the priority of Chinese Patent Application No. 201910845564.8, filed on Sep. 6, 2019 and entitled "POWER SUPPLY CONTROL CIRCUIT AND DISPLAY DEVICE". The disclosures of the aforementioned applications are hereby incorporated by reference in their entireties.

TECHNICAL FIELD

This application relates to the field of display technology, in particular to a power supply control circuit and a display device.

BACKGROUND

At present, the power supply control system of TV is mainly divided into flyback topology control, half-bridge resonance (LLC) topology control and power factor correction (PFC) circuit control. Flyback topology is mainly used for low-power power supplies (for example, 75 W or less), and PFC+LLC architecture is mainly used for medium and high-power power supplies (for example, 82 W or more). Since various chip parameters have been solidified by the manufacturers in the power supply control system used by medium and high-power TVs, when designing the power supply control system, it is necessary to adjust the device parameters of the peripheral circuit according to the size of the power supply and the requirements of the design specifications based on the chip parameters. For power supplies with different specifications and requirements in this way, the device parameters of the peripheral circuit need to be adjusted. As a result, the material list of power supply is complicated, which is not conducive to production and after-sales control.

SUMMARY

This application provides a power supply control circuit and a display device, which aims to set part of key parameters of a primary circuit of the power supply by a control circuit board, so as to reduce types of the material list and facilitate production and after-sales control.

In order to achieve the above object, this application provides a power supply control circuit, which is applied to a display device. The display device includes a control circuit board and a backlight module. The power supply control circuit includes a power factor correction circuit, a resonance circuit, a first rectification filter circuit, a second rectification filter circuit, a communication circuit and a control system.

An output terminal of the power factor correction circuit is connected to an input terminal of the resonance circuit; a first output terminal of the resonance circuit is connected to a power input terminal of the backlight module through the first rectification filter circuit, a second output terminal of the resonance circuit is connected to a power input terminal of the control circuit board through the second rectification filter circuit, and the second output terminal of the resonance circuit is connected to a second power input terminal of the communication circuit through the second rectification filter circuit; a third output terminal of the resonance circuit is connected to a power input terminal of the control system, and the third output terminal of the resonance circuit is further connected to a first power input terminal of the communication circuit; the control circuit board is in communication connection with the control system through the communication circuit; a first signal output terminal of the control system is connected to a signal input terminal of the power factor correction circuit; and a second signal output terminal of the control system is connected to a signal input of the resonance circuit.

In an embodiment, the power supply control circuit further includes a feedback circuit, a first input terminal of the feedback circuit is connected to an output terminal of the first rectification filter circuit, a second input terminal of the feedback circuit is connected to an output terminal of the second rectification filter circuit, and an output terminal of the feedback circuit is connected to a feedback terminal of the control system.

In an embodiment, the communication circuit includes a first voltage conversion circuit, a second voltage conversion circuit, a control chip, a first resistor, a second resistor, a third resistor, and a fourth resistor.

An input terminal of the first voltage conversion circuit is connected to the third output terminal of the resonance circuit, and a first output terminal of the first voltage conversion circuit is connected to a primary power supply terminal of the control chip; an input terminal of the second voltage conversion circuit is connected to the output terminal of the second rectification filter circuit, and a first output terminal of the second voltage conversion circuit is connected to a secondary power supply terminal of the control chip.

A primary data line of the control chip is connected to a first signal input terminal of the control system, and a primary clock line of the control chip is connected to a second signal input terminal of the control system; a secondary data line of the control chip is connected to a first signal output terminal of the control circuit board, and a secondary clock line of the control chip is connected to a second signal output terminal of the control circuit board; a first terminal of the first resistor is connected to a second output terminal of the second voltage conversion circuit, and a second terminal of the first resistor is connected to the secondary data line of the control chip; a first terminal of the second resistor is connected to the second output terminal of the second voltage conversion circuit, and a second terminal of the second resistor is connected to the secondary clock line of the control chip.

A first terminal of the third resistor is connected to a second output terminal of the first voltage conversion circuit, and a second terminal of the third resistor is connected to the primary data line of the control chip; and a first terminal of the fourth resistor is connected to the second output terminal of the first voltage conversion circuit, and a second terminal of the fourth resistor is connected to the primary clock line of the control chip.

In an embodiment, the power supply control circuit further includes a serial bus interface socket, a first pin 1 of the serial bus interface socket is grounded, a second pin 2 of the serial bus interface socket is connected to the secondary clock line of the control chip, and a third pin 3 of the serial bus interface socket is connected to the secondary data line of the control chip.

In an embodiment, the resonance circuit includes a fifth resistor, a sixth resistor, a first electronic switch, a second electronic switch, a first capacitor, a second capacitor, a third capacitor, a fourth capacitor, a diode, and a transformer.

A controlled terminal of the first electronic switch is connected to a first control terminal of the control system through the fifth resistor, an input terminal of the first electronic switch is connected to the output terminal of the power factor correction circuit, and an output terminal of the first electronic switch is connected to an input terminal of the second electronic switch; a controlled terminal of the second electronic switch is connected to a second control terminal of the control system through the sixth resistor, and an output terminal of the second electronic switch is grounded.

A dotted terminal of a first primary coil of the transformer is connected to the output terminal of the first electronic switch, the dotted terminal of the first primary coil of the transformer is further connected to the second signal output terminal of the control system, a non-dotted terminal of the first primary coil of the transformer is connected to a current detection terminal of the control system through the second capacitor, one terminal of the first capacitor is connected to the non-dotted terminal of the first primary coil of the transformer, and the other terminal of the first capacitor is grounded; a dotted terminal of a second primary coil of the transformer is connected to a positive electrode of the diode, and a negative electrode of the diode is connected to the power input terminal of the control system; a non-dotted terminal of the second primary coil of the transformer is grounded; one terminal of the third capacitor is connected to the negative electrode of the diode, and the other terminal of the third capacitor is grounded.

A first secondary coil of the transformer is connected to the power input terminal of the backlight module through the first rectification filter circuit, and a second secondary coil of the transformer is connected to the power input terminal of the control circuit board through the second rectification filter circuit.

In an embodiment, the power supply control circuit further includes an electromagnetic interference (EMI) filter circuit and a rectification circuit, an input terminal of the EMI filter circuit is connected to an output terminal of an alternating current (AC) power supply, an output terminal of the EMI filter circuit is connected to an input terminal of the rectification circuit, and an output terminal of the rectification circuit is connected to an input terminal of the power factor correction circuit.

In an embodiment, the power supply control circuit further includes a voltage division detection circuit, an input terminal of the voltage division detection circuit is connected to the output terminal of the EMI filter circuit, and an output terminal of the voltage division detection circuit is connected to a voltage detection terminal of the control system.

In an embodiment, the voltage division detection circuit includes a seventh resistor and an eighth resistor, a first terminal of the seventh resistor is connected to the output terminal of the EMI filter circuit, a second terminal of the seventh resistor is connected to the voltage detection terminal of the control system, the second terminal of the seventh resistor is further connected to a first terminal of the eighth resistor, and a second terminal of the eighth resistor is grounded.

In an embodiment, the voltage division detection circuit includes a ninth resistor, a first terminal of the ninth resistor is connected to the output terminal of the power factor correction circuit, and a second terminal of the ninth resistor is connected to a trigger terminal of the control system.

In order to achieve the above object, this application further provides a display device. The display device includes a control circuit board, a backlight module, and the power supply control circuit according to any one of the above.

According to the technical solution of this application, after the normal operation of the system, the communication connection and data transmission between the control circuit board and the control system are realized through the communication circuit. For power supplies of different specifications, the parameters in the software of the control circuit board can be modified by the developer, and the modified parameters can be transmitted to the control system through the communication circuit, the control system then modifies the corresponding parameters of the power factor correction circuit and the corresponding parameters of the resonance circuit according to the received modified parameters. Such setting can maximize the matching of different output and setting requirements with a set of power supply hardware, thus reducing the types of the material list and facilitating production and after-sales control.

BRIEF DESCRIPTION OF THE DRAWINGS

In order to more clearly explain the embodiments of this application or the technical solutions in the prior art, the drawings used in the description of the embodiments or the prior art will be briefly introduced below. Obviously, the drawings in the following description are merely some embodiments of this application. For those of ordinary skill in the art, other drawings can be obtained based on the structure shown in these drawings without paying creative work.

Figure 1:
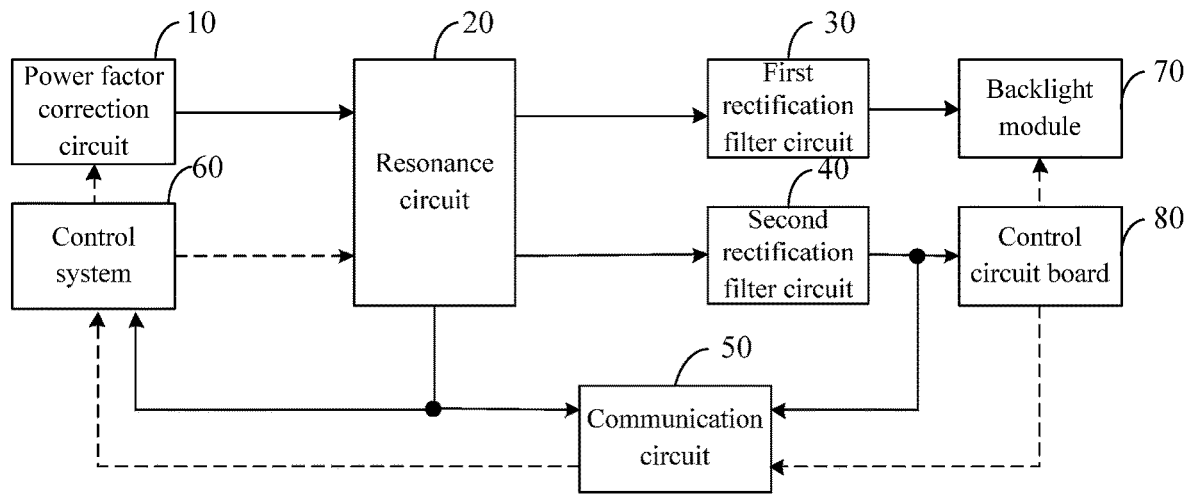
FIG. 1 is a structural block diagram of a power supply control circuit according to an embodiment of this application.

The realization of the object, functional characteristics, and advantages of this application will be further described in connection with the embodiments and with reference to the accompanying drawings.

DETAILED DESCRIPTION OF THE EMBODIMENTS

In the following, the technical solutions in the embodiments of this application will be clearly and completely described in connection with the drawings in the embodiments of this application. Obviously, the described embodiments are only a part of the embodiments of this application, and not all of the embodiments. Based on the embodiments of this application, all other embodiments obtained by those of ordinary skill in the art without creative efforts shall fall within the claimed scope of this application.

It should be noted that all directional indicators (such as up, down, left, right, front, back, etc.) in the embodiments of this application are only used to explain the relative positional relationship, movement situation, etc. between components in a specific posture (as shown in the drawings). If the specific posture changes, the directional indication also changes accordingly.

In addition, the descriptions related to "first", "second", and the like in this application are for descriptive purposes only, and cannot be understood as indicating or implying their relative importance or implicitly indicating the number of technical features indicated. Therefore, features associated with "first" and "second" may explicitly or implicitly include at least one of such features. In addition, the technical solutions of the various embodiments can be combined with each other, but they must be based on what can be achieved by those of ordinary skill in the art. When the combination of technical solutions is contradictory or cannot be achieved, it should be considered that such a combination of technical solutions does not exist, or is not within the scope of protection defined by the claims of this application.

This application provides a power supply control circuit.

Referring to FIG. 1, the power supply control circuit is applied to a display device. The display device includes a control circuit board 80 and a backlight module 70. The power supply control circuit includes a power factor correction circuit 10, a resonance circuit 20, a first rectification filter circuit 30, a second rectification filter circuit 40, a communication circuit 50 and a control system 60.

An output terminal of the power factor correction circuit 10 is connected to an input terminal of the resonance circuit 20; a first output terminal of the resonance circuit 20 is connected to a power input terminal of the backlight module 70 through the first rectification filter circuit 30, a second output terminal of the resonance circuit 20 is connected to a power input terminal of the control circuit board 80 through the second rectification filter circuit 40, and the second output terminal of the resonance circuit 20 is connected to a second power input terminal of the communication circuit 50 through the second rectification filter circuit 40; a third output terminal of the resonance circuit 20 is connected to a power input terminal of the control system, and the third output terminal of the resonance circuit 20 is further connected to a first power input terminal of the communication circuit 50; the control circuit board 80 is in communication connection with the control system 60 through the communication circuit 50; a first signal output terminal of the control system 60 is connected to a signal input terminal of the power factor correction circuit 10; and a second signal output terminal of the control system 60 is connected to a signal input of the resonance circuit 20.

In this embodiment, the control system 60 is configured to control a power factor correction (PFC) circuit and an LLC circuit (resonance circuit). The control system 60 may be integrated by a control system of the PFC circuit and a control system of the LLC circuit.

The communication circuit 50 is an I2C communication circuit 50, and is configured for realizing communication connection and data transmission between the control circuit board 80 and the control system 60, so that the control circuit board 80 can read data of the control system 60 in real time or regularly, or write data to the control system 60 through the communication circuit 50.

The power supply control circuit may further include a starting circuit, an electromagnetic interference (EMI) filter circuit 100, and a rectification circuit 110. The starting circuit is electrically connected to the control system 60, and the starting circuit is configured to provide a starting voltage for the control system 60 when the display device is powered on. An input terminal of the EMI filter circuit 100 is connected to an output terminal of an alternating current (AC) power supply, an output terminal of the EMI filter circuit 100 is connected to an input terminal of the rectification circuit 110, and an output terminal of the rectification circuit 110 is connected to an input terminal of the power factor correction circuit 10. The EMI filter circuit 100 and the rectification circuit 110 are configured to filter and rectify the AC output of the AC power supply, such as 100V to 240V AC, to input to the PFC circuit 10.

Specifically, when the display device is powered on, the starting circuit of the system or the external starting circuit may first provide the starting voltage for the control system 60 to start the control system 60. After the control system 60 is activated, the control system 60 generates a drive signal to a designated electronic switch in the resonance circuit 20 to control the electronic switch to turn on. When the electronic switch is turned on, a resonance loop composed of the conductive electronic switch, the transformer in the resonance circuit and the resonant capacitor starts to operate, and a second primary coil of the transformer of the resonance circuit 20, that is, an auxiliary winding, provides a stable voltage for the control system 60, so that the control system 60 can work normally. After the control system 60 works normally, the control system 60 disconnects the connection with the starting circuit and outputs a driving signal to two electronic switches in the resonance circuit 20 to control the two electronic switches in the resonance circuit 20 to turn on alternately. At this time, a resonance loop composed of the electronic switches, the transformer and the resonant capacitor in the resonance circuit 20 outputs energy to a secondary circuit of the power supply through the transformer.

Thereafter, for voltage output by the power supply, one branch is filtered and rectified by the first rectification filter circuit 30 to supply power to the backlight module 70, and the other branch is filtered and rectified by the second rectification filter circuit 40 to supply power to the control circuit board 80, a screen glass, a timing control board, a power amplifier, and an external equipment, etc. After the control circuit board 80 works normally, the control circuit board 80 outputs a dimming signal ADJ and an enable signal ENA to the backlight module 70 to light up the backlight module 70.

After each circuit module of the display device works normally, the control circuit board 80 can read data in the control system 60 through the communication circuit 50, and can also write data to the control system 60 through the communication circuit 50. The control system 60 sets or modifies corresponding parameters of the PFC circuit 10 and the LLC circuit 20 according to the received data, that is, the control system 60 sets or modifies part of key parameters of the PFC circuit 10 and sets or modifies some key parameters of the LLC circuit 20, so as to realize, for example, such as realizing setting and modifying output ripple of a PFC boost circuit, a PFC OVP voltage and a Brown-in/Brown-out voltage, realizing Burst mode frequency to the LLC circuit, over-power protection (OPP) of the LLC circuit and switching of different load LLC operating modes. That is to say, for power supplies of different specifications, the relevant design method needs to modify the device parameters of the peripheral circuit. While the power supply control circuit of this application can modify part of key parameters of the PFC circuit and LLC circuit through the control circuit board 80, without modifying the device parameters of the peripheral circuit, so that a set of power supply hardware can maximize the matching of different output and parameter setting requirements, thereby reducing the types of the material list, and facilitating production and after-sales control.

According to the technical solution of this application, after the normal operation of the system, the communication connection and data transmission between the control circuit board 80 and the control system 60 are realized through the communication circuit 50. For power supplies of different specifications, the parameters in the software of the control circuit board 80 can be modified by the developer, and the modified parameters can be transmitted to the control system 60 through the communication circuit 50, the control system 60 then modifies the corresponding parameters of the power factor correction circuit 10 and the corresponding parameters of the resonance circuit 20 according to the received modified parameters. Such setting can maximize the matching of different output and setting requirements with a set of power supply hardware, thus reducing the types of the material list and facilitating production and after-sales control.

Figure 2:
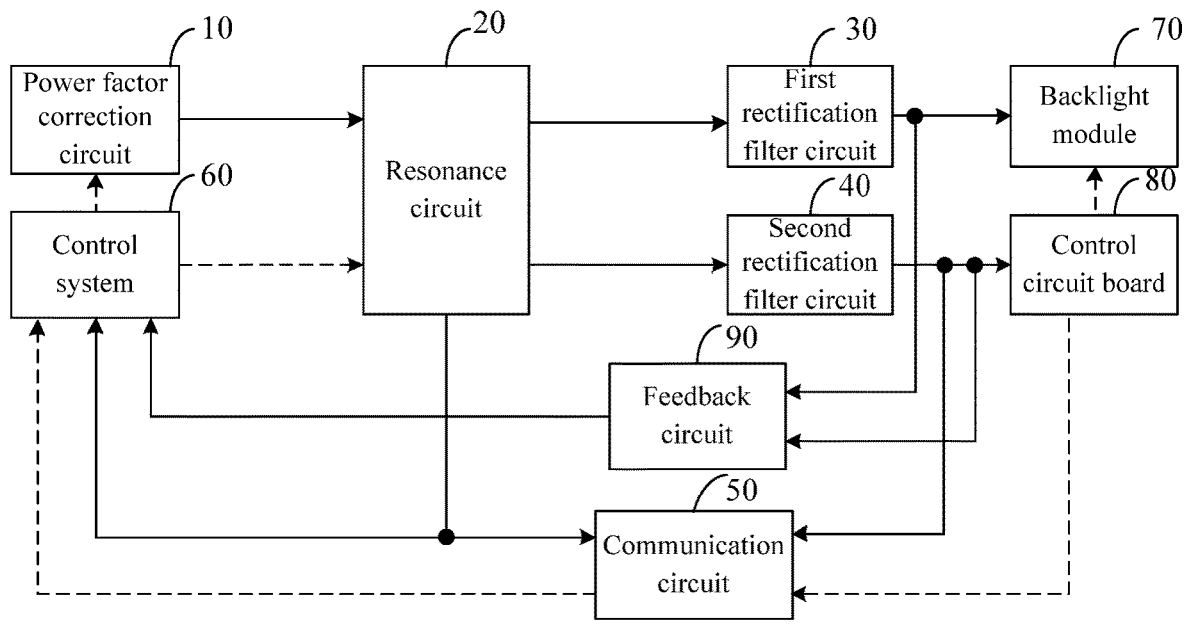
FIG. 2 is a structural block diagram of the power supply control circuit according to another embodiment of this application.

In an embodiment, referring to FIG. 2, the power supply control circuit further includes a feedback circuit 90, a first input terminal of the feedback circuit 90 is connected to an output terminal of the first rectification filter circuit 30, a second input terminal of the feedback circuit 90 is connected to an output terminal of the second rectification filter circuit 40, and an output terminal of the feedback circuit 90 is connected to a feedback terminal of the control system 60.

The feedback circuit 90 is configured to detect a voltage output to the backlight module 70, detect a voltage output to the control circuit board 80, and feedback a detected voltage to the control system 60, so that the control system 60 adjusts a voltage output to a back-end circuit, thereby achieving a stable output.

Figure 3:
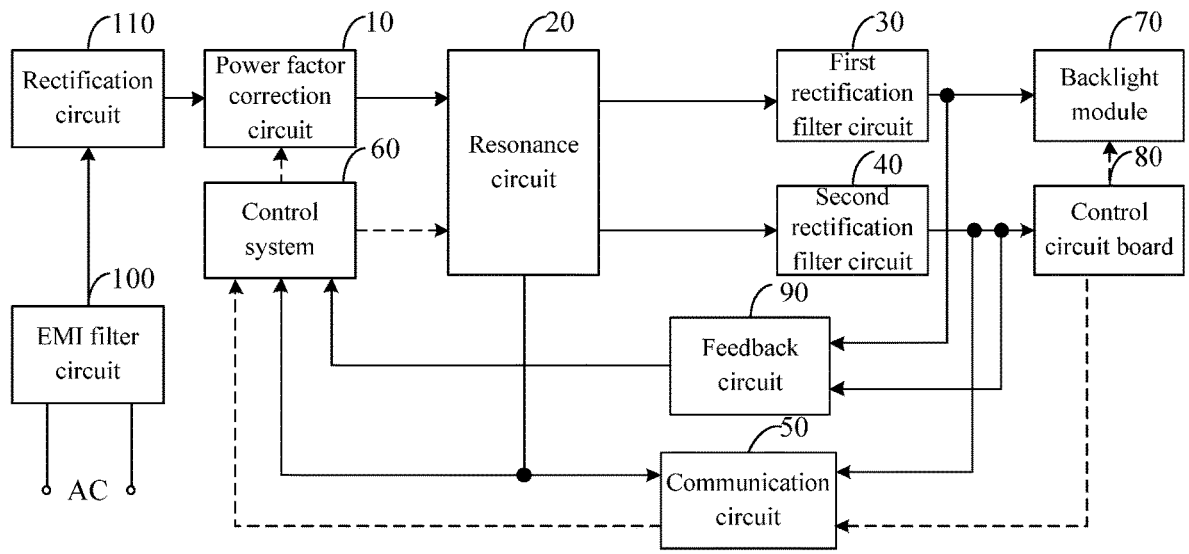
FIG. 3 is a structural block diagram of the power supply control circuit according to still another embodiment of this application.

In an embodiment, referring to FIG. 3, the power supply control circuit further includes an electromagnetic interference (EMI) filter circuit 100 and a rectification circuit 110, an input terminal of the EMI filter circuit 100 is connected to an output terminal of an alternating current (AC) power supply, an output terminal of the EMI filter circuit 100 is connected to an input terminal of the rectification circuit 110, and an output terminal of the rectification circuit 110 is connected to an input terminal of the power factor correction circuit 10.

The EMI filter circuit 100 and the rectification circuit 110 are configured to filter and rectify the AC output of the AC power supply, such as 100V to 240V AC, to input to the PFC circuit 10.

Figure 4:
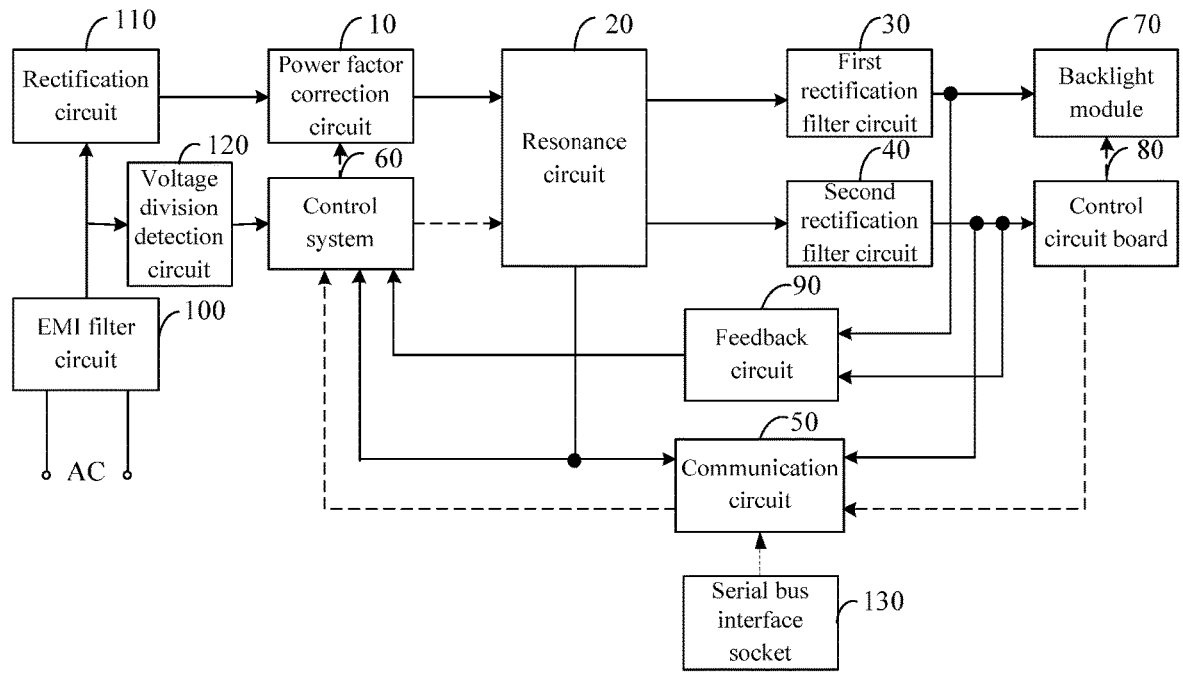
FIG. 4 is a structural block diagram of the power supply control circuit according to a further embodiment of this application.

In an embodiment, referring to FIG. 4, the power supply control circuit further includes a voltage division detection circuit 120, an input terminal of the voltage division detection circuit 120 is connected to the output terminal of the EMI filter circuit 100, and an output terminal of the voltage division detection circuit 120 is connected to a voltage detection terminal of the control system 60.

The voltage division detection circuit 120 can be realized by a plurality of resistors in series voltage division. In an embodiment, referring to FIG. 5, the voltage division detection circuit 120 includes a seventh resistor R7 and an eighth resistor R8, a first terminal of the seventh resistor R7 is connected to the output terminal of the EMI filter circuit 100, a second terminal of the seventh resistor R7 is connected to the voltage detection terminal of the control system 60, the second terminal of the seventh resistor R7 is further connected to a first terminal of the eighth resistor R8, and a second terminal of the eighth resistor R8 is grounded.

Specifically, the voltage division detection circuit 120 detects a grid voltage filtered by the EMI filter circuit 100, and transmits the detected grid voltage to the control system 60 for the control system 60 to perform corresponding operations, for example, the voltage division detection circuit 120 transmits the detected grid voltage to the control system 60, and the control system 60 analyzes the received grid voltage by running its internal programs and modules, when the analysis finds that the grid voltage is lower than a preset voltage threshold, the control system 60 generates a control signal to control the resonance circuit 20 to stop working, to stop supplying power to the back-end circuit, so as to achieve the purpose of protecting the system.

Figure 5:
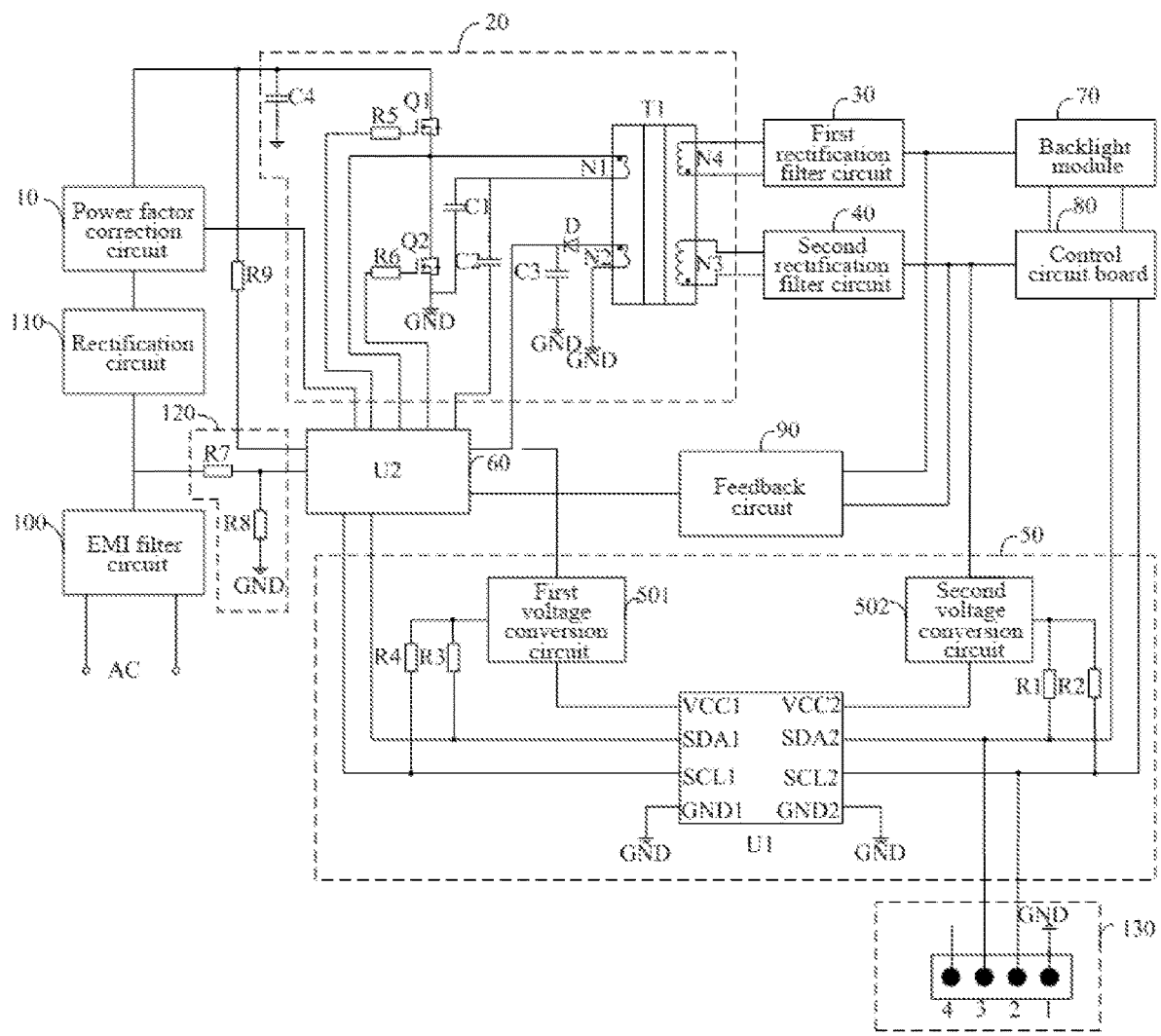
FIG. 5 is a schematic circuit structural diagram of the power supply control circuit according to an embodiment of this application.

In an embodiment, referring to FIG. 5, the communication circuit 50 includes a first voltage conversion circuit 501, a second voltage conversion circuit 502, a control chip U1, a first resistor R1, a second resistor R2, a third resistor R3, and a fourth resistor R4.

An input terminal of the first voltage conversion circuit 501 is connected to the third output terminal of the resonance circuit 20, and a first output terminal of the first voltage conversion circuit 501 is connected to a primary power supply terminal of the control chip U1; an input terminal of the second voltage conversion circuit 502 is connected to the output terminal of the second rectification filter circuit 40, and a first output terminal of the second voltage conversion circuit 502 is connected to a secondary power supply terminal of the control chip U1.

A primary data line SDA1 of the control chip U1 is connected to a first signal input terminal of the control system 60, and a primary clock line SCL1 of the control chip U1 is connected to a second signal input terminal of the control system 60; a secondary data line SDA2 of the control chip U1 is connected to a first signal output terminal of the control circuit board 80, and a secondary clock line SCL2 of the control chip U1 is connected to a second signal output terminal of the control circuit board 80; a first terminal of the first resistor R1 is connected to a second output terminal of the second voltage conversion circuit 502, and a second terminal of the first resistor R1 is connected to the secondary data line SDA2 of the control chip U1; a first terminal of the second resistor R2 is connected to the second output terminal of the second voltage conversion circuit 502, and a second terminal of the second resistor R2 is connected to the secondary clock line SCL2 of the control chip U1.

A first terminal of the third resistor R3 is connected to a second output terminal of the first voltage conversion circuit 501, and a second terminal of the third resistor R3 is connected to the primary data line SDA1 of the control chip U1; and a first terminal of the fourth resistor R4 is connected to the second output terminal of the first voltage conversion circuit 501, and a second terminal of the fourth resistor R4 is connected to the primary clock line SCL1 of the control chip U1.

The control chip U1 is an I2C protocol control chip. The first voltage conversion circuit 501 is configured to convert a voltage output from the third output terminal of the resonance circuit 20 to provide a suitable voltage for the primary of the I2C protocol control chip. The second voltage conversion circuit 502 is configured to convert a voltage output by the second rectification filter circuit 40 to provide a suitable voltage to the secondary of the I2C protocol control chip U1. The first resistor R1 is a pull-up resistor of the secondary data line SDA2 of the I2C protocol control chip, and the second resistor R2 is a pull-up resistor of the secondary clock line SCL2 of the I2C protocol control chip. The third resistor R3 is a pull-up resistor of the primary data line SDA1 of the I2C protocol control chip, and the fourth resistor R4 is a pull-up resistor of the primary clock line SCL1 of the I2C protocol control chip, which is used to ensure the normal transmission of data from the primary and secondary clock lines and data lines. At the same time, the I2C protocol control chip U1 can not only realize the data transmission between the control circuit board 80 and the control system 60, but also can isolate the cold and hot ground to ensure the normal operation of the system.

In an embodiment, referring to FIG. 5, the power supply control circuit further includes a serial bus interface socket 130, a first pin 1 of the serial bus interface socket 130, is grounded, a second pin 2 of the serial bus interface socket 130 is connected to the secondary clock line SCL2 of the control chip U1, and a third pin 3 of the serial bus interface socket 130 is connected to the secondary data line SDA2 of the control chip U1.

In this embodiment, the power supply control circuit further includes a serial bus interface socket 130, through which online information of the control system 60 is read and analyzed when the power supply malfunctions or the power supply is abnormal, so that the developer can analyze the cause of the power supply malfunction or abnormity of the power supply. In addition, when the system is not connected to the control circuit board 80, part of the key parameters of the primary circuit of the power supply can also be set and modified through the serial bus interface socket 130, which improves the application range of the power supply control circuit.

In an embodiment, referring to FIG. 5, the resonance circuit 20 includes a fifth resistor R5, a sixth resistor R6, a first electronic switch Q1, a second electronic switch Q2, a first capacitor C1, a second capacitor C2, a third capacitor C3, a fourth capacitor C4, a diode D, and a transformer T1.

A controlled terminal of the first electronic switch Q1 is connected to a first control terminal of the control system 60 through the fifth resistor R5, an input terminal of the first electronic switch Q1 is connected to the output terminal of the power factor correction circuit 10, and an output terminal of the first electronic switch Q1 is connected to an input terminal of the second electronic switch Q2; a controlled terminal of the second electronic switch Q2 is connected to a second control terminal of the control system 60 through the sixth resistor R6, and an output terminal of the second electronic switch Q2 is grounded.

A dotted terminal of a first primary coil N1 of the transformer T1 is connected to the output terminal of the first electronic switch Q1, the dotted terminal of the first primary coil N1 of the transformer T1 is further connected to the second signal output terminal of the control system 60, a non-dotted terminal of the first primary coil N1 of the transformer T1 is connected to a current detection terminal of the control system 60 through the second capacitor C2, one terminal of the first capacitor C1 is connected to the non-dotted terminal of the first primary coil N1 of the transformer T1, and the other terminal of the first capacitor C1 is grounded; a dotted terminal of a second primary coil N2 of the transformer T1 is connected to a positive electrode of the diode D, and a negative electrode of the diode D is connected to the power input terminal of the control system 60; a non-dotted terminal of the second primary coil N2 of the transformer T1 is grounded; one terminal of the third capacitor C3 is connected to the negative electrode of the diode D, and the other terminal of the third capacitor C3 is grounded.

A first secondary coil N4 of the transformer T1 is connected to the backlight module 70 through the first rectification filter circuit 30, and a second secondary coil N3 of the transformer T1 is connected to the control circuit board 80 through the second rectification filter circuit 40.

Specifically, when the display device is powered on, the starting circuit of the system may first provide the starting voltage for the control system 60 to start the control system 60. After the control system 60 starts running, the control system 60 generates a driving signal to the first electronic switch Q1 to control the first electronic switch Q1 to be turned on. After the first electronic switch Q1 is turned on, a resonance loop composed of the first electronic switch Q1, the first primary coil N1 of the transformer T1 and the first capacitor C1 starts to work. After the resonance circuit 20 is operated, the second primary coil N2 and the diode D provide a stable voltage to the control system 60 so that the control system 60 can operate normally. After the control system 60 works normally, the control system 60 disconnects the connection with the starting circuit and outputs a driving signal to the first electronic switch Q1 and the second electronic switch Q2 to control the first electronic switch Q1 and the second electronic switch Q2 to turn on alternately. At this time, a resonance loop composed of the electronic switches, the transformer T1 and the resonant capacitor C1 in the resonance circuit 20 outputs energy to the secondary circuit through the transformer T1. The first electronic switch Q1 and the second electronic switch Q2 may be a transistor field effect transistor.

In an embodiment, referring to FIG. 5, the voltage division detection circuit further includes a ninth resistor R9, a first terminal of the ninth resistor R9 is connected to the output terminal of the power factor correction circuit 10, and a second terminal of the ninth resistor R9 is connected to a trigger terminal of the control system 60.

In this embodiment, the ninth resistor R9 is configured to provide a starting voltage to the control system 60 when the display device is powered on, so that the control system 60 can be started normally.

This application further provides a display device including the power supply control circuit, the control circuit board 80, and the backlight module 70 according to any one of the above. For the detailed structure of the power supply control circuit, please refer to the above-mentioned embodiments, which will not be repeated here. It is understandable that since the above-mentioned power supply control circuit is included in the display device of this application, the embodiments of the display device of this application includes all the technical solutions of the above-mentioned power supply control circuit, and the achieved technical effects are also completely the same, which will not be repeated here.

In this embodiment, the display device may be a display device having a display panel, such as a television, a tablet computer, or a mobile phone.

The above are only optional embodiments of this application, and thus does not limit the scope of this application, and the equivalent structural transformation made by the content of the specification and the drawings of this application, or directly/indirectly applied to other related technical fields are all included in the scope of this application.

What is claimed is:
1. A power supply control circuit, applied to a display device comprising a control circuit board and a backlight module, wherein the power supply control circuit comprises a power factor correction circuit, a resonance circuit, a first rectification filter circuit, a second rectification filter circuit, a communication circuit and a control system;

an output terminal of the power factor correction circuit is connected to an input terminal of the resonance circuit; a first output terminal of the resonance circuit is connected to a power input terminal of the backlight module through the first rectification filter circuit, a second output terminal of the resonance circuit is connected to a power input terminal of the control circuit board through the second rectification filter circuit, and the second output terminal of the resonance circuit is connected to a second power input terminal of the communication circuit through the second rectification filter circuit; a third output terminal of the resonance circuit is connected to a power input terminal of the control system, and the third output terminal of the resonance circuit is further connected to a first power input terminal of the communication circuit; the control circuit board is in communication connection with the control system through the communication circuit; a first signal output terminal of the control system is connected to a signal input terminal of the power factor correction circuit; and a second signal output terminal of the control system is connected to a signal input of the resonance circuit.

2. The power supply control circuit of claim 1, wherein the power supply control circuit further comprises a feedback circuit, a first input terminal of the feedback circuit is connected to an output terminal of the first rectification filter circuit, a second input terminal of the feedback circuit is connected to an output terminal of the second rectification filter circuit, and an output terminal of the feedback circuit is connected to a feedback terminal of the control system.

3. The power supply control circuit of claim 2, wherein the communication circuit comprises a first voltage conversion circuit, a second voltage conversion circuit, a control chip, a first resistor, a second resistor, a third resistor, and a fourth resistor;
an input terminal of the first voltage conversion circuit is connected to the third output terminal of the resonance circuit, and a first output terminal of the first voltage conversion circuit is connected to a primary power supply terminal of the control chip; an input terminal of the second voltage conversion circuit is connected to the output terminal of the second rectification filter circuit, and a first output terminal of the second voltage conversion circuit is connected to a secondary power supply terminal of the control chip;
a primary data line of the control chip is connected to a first signal input terminal of the control system, and a primary clock line of the control chip is connected to a second signal input terminal of the control system; a secondary data line of the control chip is connected to a first signal output terminal of the control circuit board, and a secondary clock line of the control chip is connected to a second signal output terminal of the control circuit board; a first terminal of the first resistor is connected to a second output terminal of the second voltage conversion circuit, and a second terminal of the first resistor is connected to the secondary data line of the control chip; a first terminal of the second resistor is connected to the second output terminal of the second voltage conversion circuit, and a second terminal of the second resistor is connected to the secondary clock line of the control chip; and
a first terminal of the third resistor is connected to a second output terminal of the first voltage conversion circuit, and a second terminal of the third resistor is connected to the primary data line of the control chip; and a first terminal of the fourth resistor is connected to the second output terminal of the first voltage conversion circuit, and a second terminal of the fourth resistor is connected to the primary clock line of the control chip.

4. The power supply control circuit of claim 3, wherein the power supply control circuit further comprises a serial bus interface socket, a first pin of the serial bus interface socket is grounded, a second pin of the serial bus interface socket is connected to the secondary clock line of the control chip, and a third pin of the serial bus interface socket is connected to the secondary data line of the control chip.

5. The power supply control circuit of claim 1, wherein the resonance circuit comprises a fifth resistor, a sixth resistor, a first electronic switch, a second electronic switch, a first capacitor, a second capacitor, a third capacitor, a fourth capacitor, a diode, and a transformer;
a controlled terminal of the first electronic switch is connected to a first control terminal of the control system through the fifth resistor, an input terminal of the first electronic switch is connected to the output terminal of the power factor correction circuit, and an output terminal of the first electronic switch is connected to an input terminal of the second electronic switch; a controlled terminal of the second electronic switch is connected to a second control terminal of the control system through the sixth resistor, and an output terminal of the second electronic switch is grounded;
a dotted terminal of a first primary coil of the transformer is connected to the output terminal of the first electronic switch, the dotted terminal of the first primary coil of the transformer is further connected to the second signal output terminal of the control system, a non-dotted terminal of the first primary coil of the transformer is connected to a current detection terminal of the control system through the second capacitor, one terminal of the first capacitor is connected to the non-dotted terminal of the first primary coil of the transformer, and the other terminal of the first capacitor is grounded; a dotted terminal of a second primary coil of the transformer is connected to a positive electrode of the diode, and a negative electrode of the diode is connected to the power input terminal of the control system; a non-dotted terminal of the second primary coil of the transformer is grounded; one terminal of the third capacitor is connected to the negative electrode of the diode, and the other terminal of the third capacitor is grounded; and
a first secondary coil of the transformer is connected to the power input terminal of the backlight module through the first rectification filter circuit, and a second secondary coil of the transformer is connected to the power input terminal of the control circuit board through the second rectification filter circuit.

6. The power supply control circuit of claim 1, wherein the power supply control circuit further comprises an electromagnetic interference (EMI) filter circuit and a rectification circuit, an input terminal of the EMI filter circuit is connected to an output terminal of an alternating current (AC) power supply, an output terminal of the EMI filter circuit is connected to an input terminal of the rectification circuit, and an output terminal of the rectification circuit is connected to an input terminal of the power factor correction circuit.

7. The power supply control circuit of claim 6, wherein the power supply control circuit further comprises a voltage division detection circuit, an input terminal of the voltage division detection circuit is connected to the output terminal of the EMI filter circuit, and an output terminal of the voltage division detection circuit is connected to a voltage detection terminal of the control system.

8. The power supply control circuit of claim 7, wherein the voltage division detection circuit comprises a seventh resistor and an eighth resistor, a first terminal of the seventh resistor is connected to the output terminal of the EMI filter circuit, a second terminal of the seventh resistor is connected to the voltage detection terminal of the control system, the second terminal of the seventh resistor is further connected to a first terminal of the eighth resistor, and a second terminal of the eighth resistor is grounded.

9. The power supply control circuit of claim 8, wherein the power supply control circuit further comprises a ninth resistor, a first terminal of the ninth resistor is connected to the output terminal of the power factor correction circuit, and a second terminal of the ninth resistor is connected to a trigger terminal of the control system.

10. A display device, wherein the display device comprises a control circuit board, a backlight module and a power supply control circuit, the power supply control circuit comprises a power factor correction circuit, a resonance circuit, a first rectification filter circuit, a second rectification filter circuit, a communication circuit and a control system;
   an output terminal of the power factor correction circuit is connected to an input terminal of the resonance circuit; a first output terminal of the resonance circuit is connected to a power input terminal of the backlight module through the first rectification filter circuit, a second output terminal of the resonance circuit is connected to a power input terminal of the control circuit board through the second rectification filter circuit, and the second output terminal of the resonance circuit is connected to a second power input terminal of the communication circuit through the second rectification filter circuit; a third output terminal of the resonance circuit is connected to a power input terminal of the control system, and the third output terminal of the resonance circuit is further connected to a first power input terminal of the communication circuit; the control circuit board is in communication connection with the control system through the communication circuit; a first signal output terminal of the control system is connected to a signal input terminal of the power factor correction circuit; and a second signal output terminal of the control system is connected to a signal input of the resonance circuit.

11. The display device of claim 10, wherein the power supply control circuit further comprises a feedback circuit, a first input terminal of the feedback circuit is connected to an output terminal of the first rectification filter circuit, a second input terminal of the feedback circuit is connected to an output terminal of the second rectification filter circuit, and an output terminal of the feedback circuit is connected to a feedback terminal of the control system.

12. The display device of claim 11, wherein the communication circuit comprises a first voltage conversion circuit, a second voltage conversion circuit, a control chip, a first resistor, a second resistor, a third resistor, and a fourth resistor;
   an input terminal of the first voltage conversion circuit is connected to the third output terminal of the resonance circuit, and a first output terminal of the first voltage conversion circuit is connected to a primary power supply terminal of the control chip; an input terminal of the second voltage conversion circuit is connected to the output terminal of the second rectification filter circuit, and a first output terminal of the second voltage conversion circuit is connected to a secondary power supply terminal of the control chip;
   a primary data line of the control chip is connected to a first signal input terminal of the control system, and a primary clock line of the control chip is connected to a second signal input terminal of the control system; a secondary data line of the control chip is connected to a first signal output terminal of the control circuit board, and a secondary clock line of the control chip is connected to a second signal output terminal of the control circuit board; a first terminal of the first resistor is connected to a second output terminal of the second voltage conversion circuit, and a second terminal of the first resistor is connected to the secondary data line of the control chip; a first terminal of the second resistor is connected to the second output terminal of the second voltage conversion circuit, and a second terminal of the second resistor is connected to the secondary clock line of the control chip; and
   a first terminal of the third resistor is connected to a second output terminal of the first voltage conversion circuit, and a second terminal of the third resistor is connected to the primary data line of the control chip; and a first terminal of the fourth resistor is connected to the second output terminal of the first voltage conversion circuit, and a second terminal of the fourth resistor is connected to the primary clock line of the control chip.

13. The display device of claim 12, wherein the power supply control circuit further comprises a serial bus interface socket, a first pin of the serial bus interface socket is grounded, a second pin of the serial bus interface socket is connected to the secondary clock line of the control chip, and a third pin of the serial bus interface socket is connected to the secondary data line of the control chip.

14. The display device of claim 10, wherein the resonance circuit comprises a fifth resistor, a sixth resistor, a first electronic switch, a second electronic switch, a first capacitor, a second capacitor, a third capacitor, a fourth capacitor, a diode, and a transformer;
   a controlled terminal of the first electronic switch is connected to a first control terminal of the control system through the fifth resistor, an input terminal of the first electronic switch is connected to the output terminal of the power factor correction circuit, and an output terminal of the first electronic switch is connected to an input terminal of the second electronic switch; a controlled terminal of the second electronic switch is connected to a second control terminal of the control system through the sixth resistor, and an output terminal of the second electronic switch is grounded;
   a dotted terminal of a first primary coil of the transformer is connected to the output terminal of the first electronic switch, the dotted terminal of the first primary coil of the transformer is further connected to the second signal output terminal of the control system, a non-dotted terminal of the first primary coil of the transformer is connected to a current detection terminal of the control system through the second capacitor, one terminal of the first capacitor is connected to the non-dotted terminal of the first primary coil of the transformer, and the other terminal of the first capacitor is grounded; a dotted terminal of a second primary coil of the transformer is connected to a positive electrode of the diode, and a negative electrode of the diode is connected to the power input terminal of the control system; a non-dotted terminal of the second primary coil of the transformer is grounded; one terminal of the third capacitor is connected to the negative electrode of the diode, and the other terminal of the third capacitor is grounded; and a first secondary coil of the transformer is connected to the power input terminal of the backlight module through the first rectification filter circuit, and a second secondary coil of the transformer is connected to the power input terminal of the control circuit board through the second rectification filter circuit.

15. The display device of claim 10, wherein the power supply control circuit further comprises an electromagnetic interference (EMI) filter circuit and a rectification circuit, an input terminal of the EMI filter circuit is connected to an output terminal of an alternating current (AC) power supply, an output terminal of the EMI filter circuit is connected to an input terminal of the rectification circuit, and an output terminal of the rectification circuit is connected to an input terminal of the power factor correction circuit.

16. The display device of claim 15, wherein the power supply control circuit further comprises a voltage division detection circuit, an input terminal of the voltage division detection circuit is connected to the output terminal of the EMI filter circuit, and an output terminal of the voltage division detection circuit is connected to a voltage detection terminal of the control system.

17. The display device of claim 16, wherein the voltage division detection circuit comprises a seventh resistor and an eighth resistor, a first terminal of the seventh resistor is connected to the output terminal of the EMI filter circuit, a second terminal of the seventh resistor is connected to the voltage detection terminal of the control system, the second terminal of the seventh resistor is further connected to a first terminal of the eighth resistor, and a second terminal of the eighth resistor is grounded.

18. The display device of claim 17, wherein the voltage division detection circuit comprises a ninth resistor, a first terminal of the ninth resistor is connected to the output terminal of the power factor correction circuit, and a second terminal of the ninth resistor is connected to a trigger terminal of the control system.

* * * * *